US006328358B1

(12) United States Patent
Berweiler

(10) Patent No.: US 6,328,358 B1
(45) Date of Patent: Dec. 11, 2001

(54) COVER PART LOCATED WITHIN THE BEAM PATH OF A RADAR

(75) Inventor: Eugen Berweiler, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/401,763

(22) Filed: Sep. 23, 1999

(30) Foreign Application Priority Data

Sep. 24, 1998 (DE) .............................. 198 44 021

(51) Int. Cl.$^7$ .................................................. B60R 19/52
(52) U.S. Cl. .................... 293/115; 180/68.6; 296/194
(58) Field of Search .................... 343/872, 909; 293/115; 296/194, 203.02; 180/68.6

(56) References Cited

U.S. PATENT DOCUMENTS

| Re. 34,907 | * | 4/1995 | Gross | 180/68.6 |
|---|---|---|---|---|
| 4,241,129 | * | 12/1980 | Marton et al. | 428/216 |
| 4,627,657 | * | 12/1986 | Daniels et al. | 296/91 |
| 4,896,164 | | 1/1990 | Burke et al. | 343/872 |
| 4,920,460 | * | 4/1990 | Mori | 362/61 |
| 4,944,540 | * | 7/1990 | Mansoor et al. | 293/115 |
| 5,125,714 | * | 6/1992 | Lecher | 296/180.5 |
| 5,205,597 | * | 4/1993 | Chase | 293/115 |
| 5,487,575 | * | 1/1996 | Chase | 293/115 |
| 5,503,444 | * | 4/1996 | Rouse et al. | 293/115 |
| 5,658,041 | * | 8/1997 | Girardot et al. | 296/194 |
| 6,027,150 | * | 2/2000 | Flewitt et al. | 293/115 |

FOREIGN PATENT DOCUMENTS

| 0 343 813 | 10/1989 | (DE) . |
|---|---|---|
| 196 25 520 A1 | 6/1996 | (DE) . |
| PCT/US97/01639 | 2/1997 | (WO) . |

OTHER PUBLICATIONS

Article by A. Feuerstein and W. Bialojan entitled "Beschichten im Vakuum" dated Dec. 1992.

* cited by examiner

Primary Examiner—Don Wong
Assistant Examiner—Tuyet T. Vo
(74) Attorney, Agent, or Firm—Crowell & Moring LLP

(57) ABSTRACT

A cover part which is located within the beam path of a radar and is composed of plastic with subregions which are composed of metal and are visible from the outside is not intended to influence the function of the radar.

To this end, such a cover part is designed as follows:
  the plastic path has a multilayer construction,
  the subregions composed of metal are formed by an extremely thin layer which is vapour-deposited onto one of the layers, which acts as a substrate,
  the subregions composed of metal are covered by a transparent layer towards the surface side from which they are intended to appear to be visible from the outside, or are vapour-deposited onto this layer.

9 Claims, 2 Drawing Sheets

COVER PART LOCATED WITHIN THE BEAM PATH OF A RADAR

This application claims the priority of 198 44 021.9, filed Sep. 24, 1998, the disclosure of which is expressly incorporated by reference herein.

BACKGROUND AND SUMMARY OF THE INVENTION

The invention relates to a cover part which is located within the beam path of a radar.

The metallic subregions can disturb the operation of the radar, for which reason the invention is concerned with the problem of creating a remedy without detracting from the form of the metallic pattern of the cover part which is visible from the outside.

The cover part designed according to the invention is intended to be used, in particular, to cover a radar distance measuring device which is fitted behind a front grill of a motor vehicle. In this case, the structure of the front grill, which is visible from the outside, is intended to appear visually in the same form in the cover part, despite the fact that it has a different structure. The visible structure of the radiator grill is composed of plastic struts which are located one above the other horizontally and spaced apart, and whose visible front edges are each covered by a decorative chrome strip. These decorative chrome strips are intended to appear in the same form in the cover part, to be precise in such a way as if there were uninterrupted decorative strips between the cover part and the rest of the front grill. The way in which this is achieved in detail according to the invention will be described in detail in the following text with reference to an example.

Other objects, advantages and novel features of the present invention will become apparent from the following detailed description of the invention when considered in conjunction with the accompanying drawings.

BRIEF DESCRIPTION OF THE DRAWINGS

A corresponding exemplary embodiment of the invention is illustrated in the drawing, in which.

DETAILED DESCRIPTION OF THE PREFERRED EMBODIMENT

Figure 1:
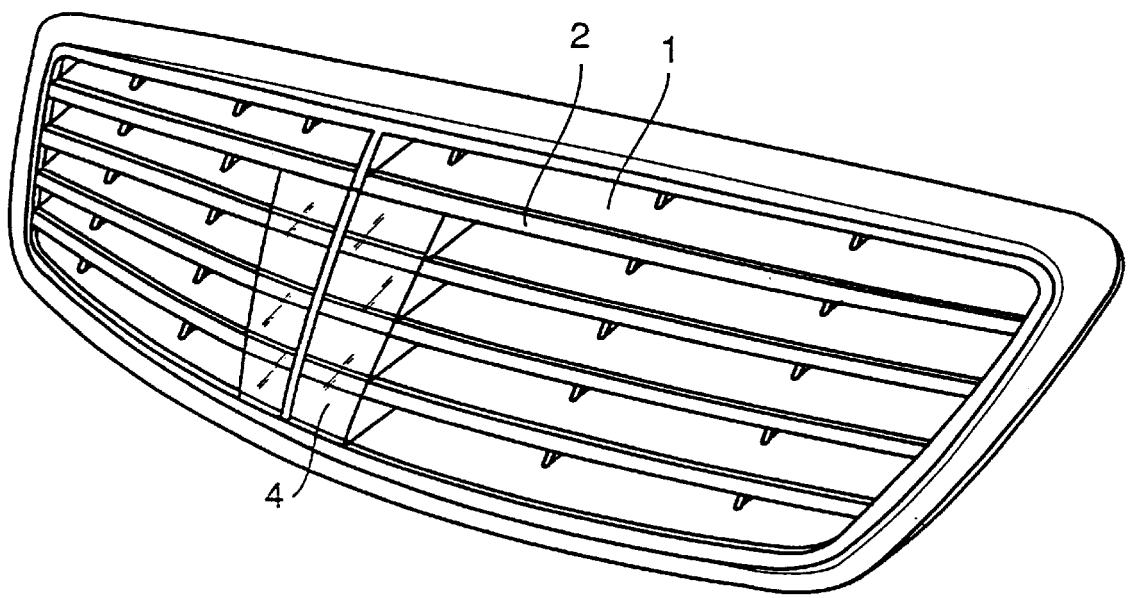
FIG. 1 shows the view of a vehicle front grill from the front.
Figure 2:
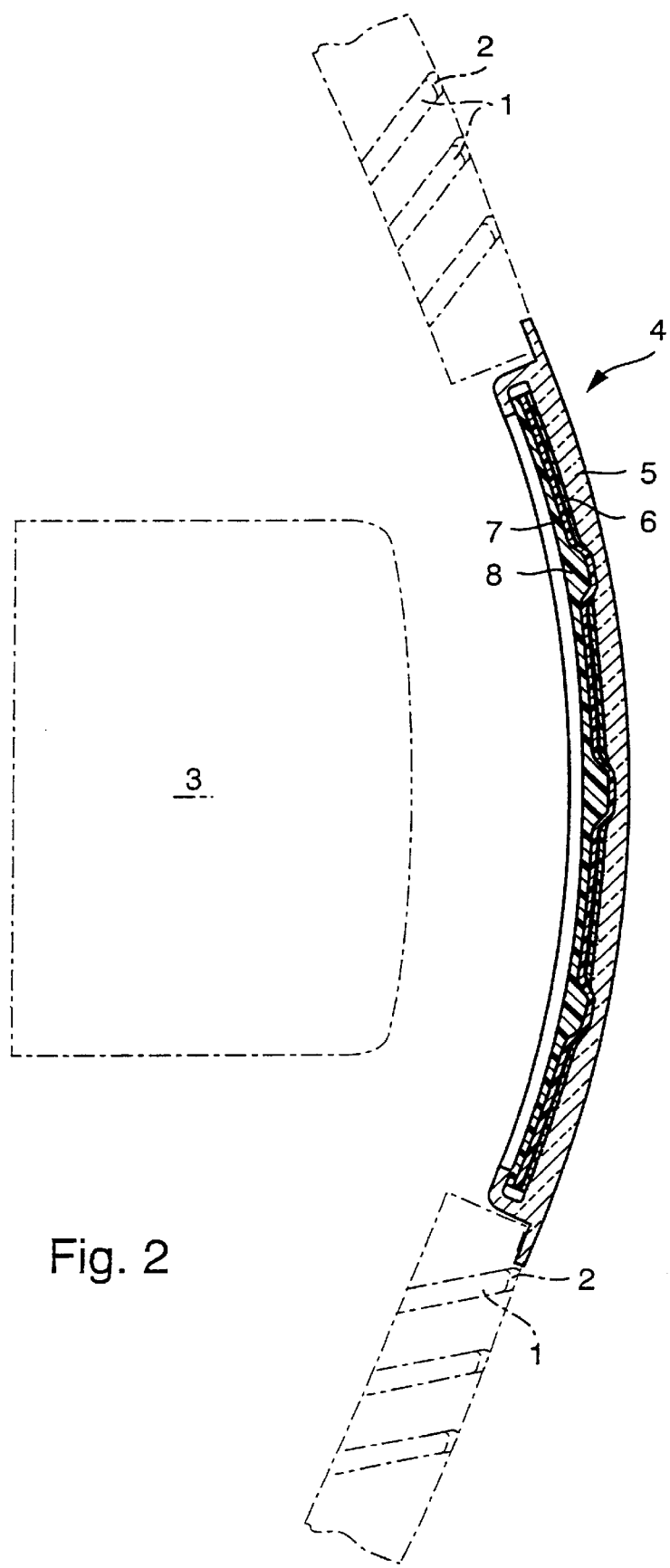
FIG. 2 shows a section along the line II—II through a region which is designed for radar beams to pass through without interference.

A front grill of a motor vehicle has plastic struts 1 which run horizontally in a surrounding frame part and are spaced apart from one another, and which are each provided on their front visible front edges with shiny decorative chrome strips 2.

A radar 3 for distance measurement is intended to be fitted behind the middle part of the front grill, transmitting and receiving the radar beams through the front grill. In this region, in which the radar beams strike the front grill, the struts 1 are cut out and are replaced by a cover part 4 having a closed surface.

This cover part 4 is a part which is essentially in the form of a plate and is composed of a total of four main layers.

The first front layer 5 is a glass-clear transparent plastic layer and is designed as supporting body in such a manner that it is possible to fit this supporting body within the adjacent strut structure of the front grill.

In those regions in which the decorative chrome strips 2 would be located if the struts 1 were not cut out, hollow grooves, which are open to the rear, in the form of decorative chrome strips pointing forwards are formed within this first layer 5. Furthermore, a hollow groove which runs at right angles to the abovementioned hollow grooves is provided in the middle of the area in the first layer 5 which is cut out from the struts 1 and is intended to act as an imitation of a vertically running decorative strip at this point.

Those regions which are located outside the open hollow grooves in the first layer 5 of the cover part 4 are covered by a non-transparent plastic layer, which is applied like a mask. This represents the second layer 6 of the total of four successive layers of the cover part 4.

A thin metal layer composed of indium is vapour-deposited onto the second layer 6, in which those hollow-groove regions which are formed in the first layer 5 are cut out. The layer thickness is about 40 nanometres. This vapour-deposited metal layer is the third layer 7 of the four-layer cover part 4. The vapour-deposited metal layer, that is to say the third layer 7, is covered on its open surface by a fourth, non-transparent layer 8. This fourth layer 8 essentially acts as a mechanical protection layer. It can, for example, be sprayed on. In this case, the metal layer, that is to say the third layer 7, is initially coated with a protective varnish in order that the metal is not mechanically damaged during application of the sprayed layer, that is to say the fourth layer 8. Since, as a rule, a fourth layer 8 which is sprayed onto a protective varnish does not adhere well mechanically to the protective layer, undercuts are provided in the edge regions of the first layer 5, and can be filled by the sprayed material in order to provide mechanical retention for the fourth layer 8 with the first layer 5.

The metal layer which is vapour-deposited into the hollow grooves in the first transparent layer 5 and is composed of indium corresponds visually to the adjacent decorative chrome strips, with an identical form. Someone casually passing by a front grill described in the above manner can barely see the existence of the inserted cover part 4; rather than this, he will think he is seeing a front grill with decorative chrome strips passing through uniformly.

The fourth layer 8 has projections which engage in the hollow grooves in the first layer 5 and fill them, to provide particular protection for the metal layer located within the hollow grooves.

The fourth layer 8 may also be a non-transparent plastic panel, which is bonded onto the layers underneath it.

Cover parts according to the invention are particularly suitable for being provided with metallic ornaments such as company emblems.

For example, such a part with a circular design as a disc can be decorated with a star that appears to be metallic.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cover part located within the beam path of a radar, composed of plastic and having subregions which are visible from the outside and are composed of metal, comprising:

the plastic part has a multilayer construction;

the subregions composed of metal are formed by an extremely thin layer which is vapour-deposited onto one of the layers, which acts as a substrate; and the subregions composed of metal are covered by a transparent layer towards the surface side from which they are intended to appear to be visible from the outside, or are vapour-deposited onto this layer, wherein a structure of this cover part is provided with at least four successive layers in the direction of the radar beams, a first plastic layer which points outwards, is transparent, this first layer is followed by a non-transparent second plastic layer having recesses passing through for defining a metal pattern which can be seen from the outside, the third layer is composed of metal which is applied onto the second layer and those subregions of the first layer which are located in the recesses in the second layer, the fourth layer is composed of a non-transparent plastic.

2. Cover part according to claim 1, wherein the metal layer is applied over the entire surface in the entire region through which the radar beams are to pass, and are covered by a non-transparent layer in those regions which are not intended to be visible from the outside.

3. Cover part according to claim 1, wherein the metal layer is composed of indium.

4. Cover part according to claim 1, wherein the thickness of the metal layer is measured in nanometers.

5. Cover part according to claim 1, wherein said cover part being an insert for a component, in particular for insertion into a front grill of a motor vehicle, and the metal pattern which can be seen on the cover part is visually matched to a grid and/or strut structure of the adjacent component, in such a manner as to produced the impression that the grid and/or strut structure of the adjacent component is present in identical form in the cover part.

6. Cover part according to claim 1, wherein negative indentations are provided in order to hold the third layer, which is composed of metal, in the first layer.

7. Cover part according to claim 6, wherein the fourth layer is provided with projections which engage in a positive locking manner in the negative indentations in the first layer.

8. Cover part according to claim 1, wherein the fourth layer is formed from a plastic sprayed layer and is mechanically anchored to the first layer in its edge region.

9. Cover part according to claim 8, wherein a varnish-like protective layer is applied on that surface of the third layer which faces the fourth layer.

* * * * *